(12) United States Patent
Koike

(10) Patent No.: US 7,485,676 B2
(45) Date of Patent: Feb. 3, 2009

(54) NON-BIREFRINGENT OPTICAL RESIN MATERIAL AND ITS PRODUCING METHOD

(76) Inventor: Yasuhiro Koike, 534-23, Ichigao-cho, Aoba-ku, Yokohama-shi, Kanagawa, 225-0024 (JP)

( * ) Notice: Subject to any disclaimer, the term of this patent is extended or adjusted under 35 U.S.C. 154(b) by 347 days.

(21) Appl. No.: 10/506,978

(22) PCT Filed: Mar. 10, 2003

(86) PCT No.: PCT/JP03/02790

§ 371 (c)(1),
(2), (4) Date: Sep. 8, 2004

(87) PCT Pub. No.: WO03/076982

PCT Pub. Date: Sep. 18, 2003

(65) Prior Publication Data

US 2005/0119389 A1    Jun. 2, 2005

(30) Foreign Application Priority Data

Mar. 12, 2002 (JP) .............................. 2002-067457

(51) Int. Cl.
*C08K 3/26* (2006.01)
(52) U.S. Cl. .................. 524/425; 524/418; 524/424
(58) Field of Classification Search ................ 524/418, 524/424, 425
See application file for complete search history.

(56) References Cited

U.S. PATENT DOCUMENTS

| 3,265,777 A | 8/1966 | Marks et al. |
| 4,373,065 A | 2/1983 | Prest, Jr. |
| 6,586,515 B1 | 7/2003 | Koike |

FOREIGN PATENT DOCUMENTS

| EP | 0 740 168 A1 | 10/1996 |
| EP | 0 911 360 A1 | 4/1999 |
| JP | 61-019656 | 1/1986 |
| JP | 61-108617 | 5/1986 |
| JP | 62-240901 | 10/1987 |
| JP | 03-088714 | 4/1991 |
| JP | 11012465 | 1/1999 |
| JP | 11-293116 | 10/1999 |
| JP | 2000313816 | 11/2000 |
| JP | 2001208901 | 8/2001 |
| WO | WO 97/32226 A1 | 9/1997 |
| WO | WO 01/25364 A1 | 4/2001 |
| WO | 01/25364 | 12/2001 |

OTHER PUBLICATIONS

"Optics", vol. 20, No. 2, p. 80(30)-81(31), Feb. 1991.
S. O. Ogadhoh, et al., "Particle rearrangement during processing of glass-reinforced polystyrene by injection moulding", *Composites Part A: Applied Science and Manufacturing*, vol. 27A, No. 1, 1996, pp. 57-63.
Supplementary European Search Report mailed on Jun. 29, 2007 for European Patent Application No. 03 74 4038. (5pp).

*Primary Examiner*—Edward J Cain
(74) *Attorney, Agent, or Firm*—Staas & Halsey LLP

(57) ABSTRACT

A non-birefringent optical resin material is composed of a resin material and inorganic fine particle material birefringence sign of which are the same. A molten resin material, which contains an inorganic fine particle material, dispersed therein, of the same birefringence sign as that of the resin material, is caused to flow into a mold 4 through a gate 5. The molten material flows as to expand radially. Velocity vector of the flow has normal components P, R in addition to straight-ahead component S. Bonding chains of the resin material are generally orientated to the direction of velocity vector. In the vicinity of points A, B on an equiphase face 7, bonding chains of the resin material are generally orientated to lines extending from the exit of the gate 5 to point A and B, respectively. Flowing velocity has a gradient around each fine particle, causing the fine particle to be influenced by a moment and to tend to orientate so that the major axis of the particle is directed approximately parallel to equiphase faces 6 to 9 of the flow. On the whole material, this cancels birefringence.

4 Claims, 16 Drawing Sheets

F I G. 6
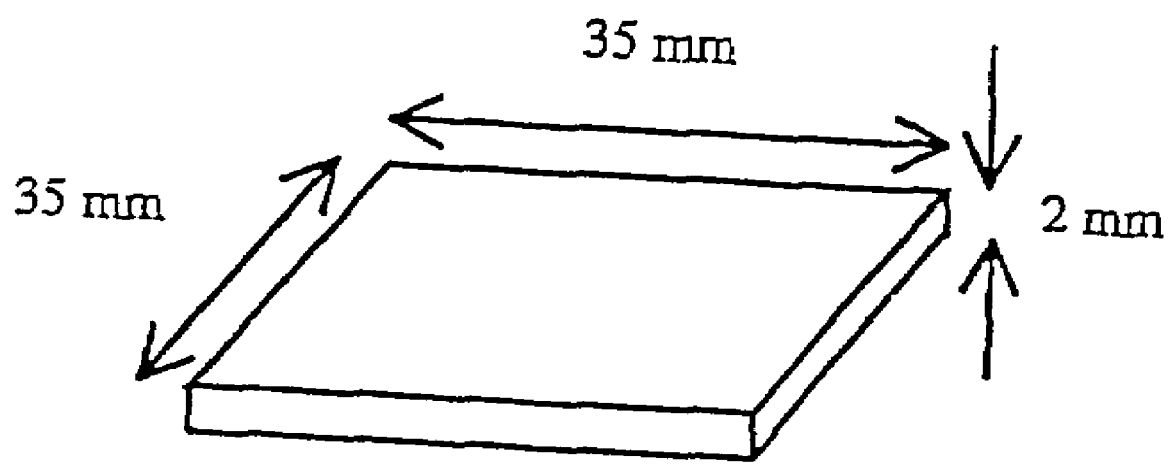

F I G. 7
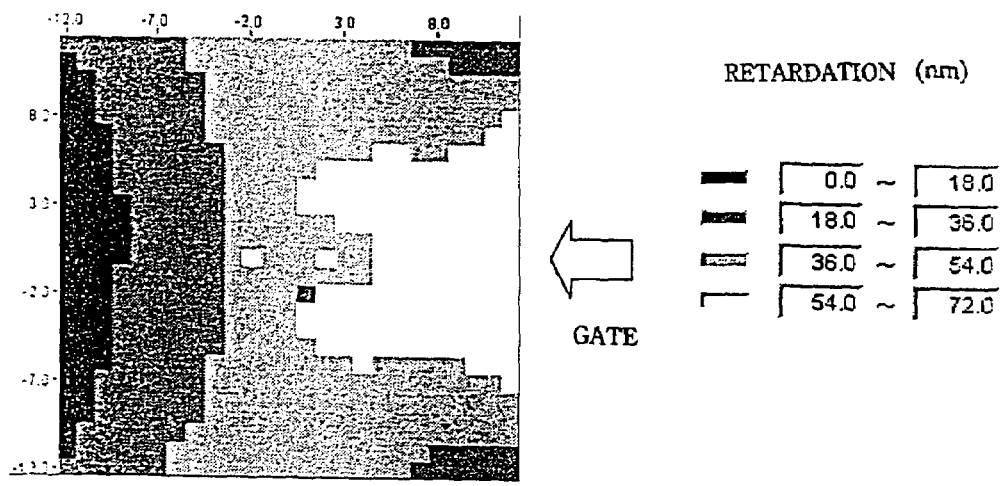
(a) ARTON
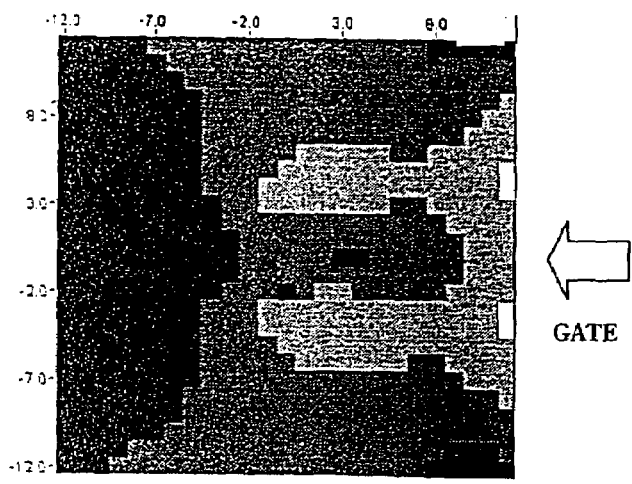
(b) NEEDLE-LIKE BASIC MAGNESIUM
SULFATE CRYSTALS ADDED ARTON FIG. 8
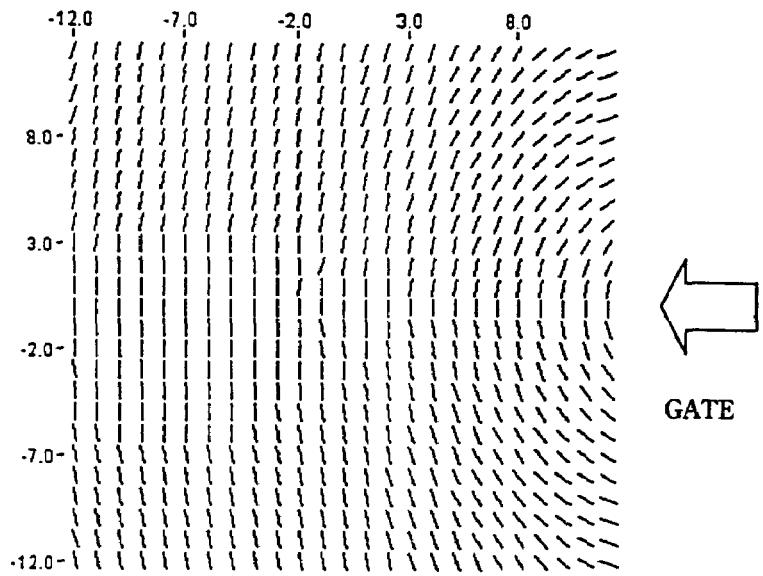
(a) ARTON
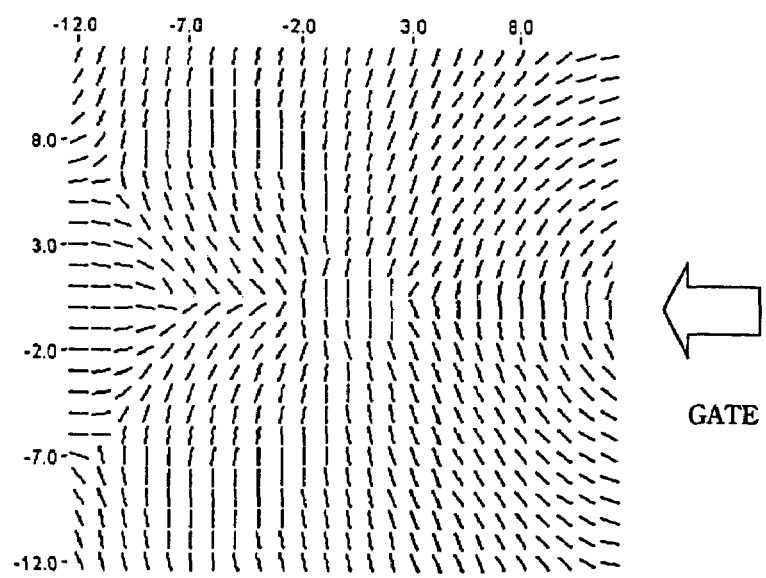
(b) NEEDLE-LIKE BASIC MAGNESIUM
SULFATE CRYSTALS ADDED ARTON

RETARDATION MEASUREMENT AREA

FIG. 10
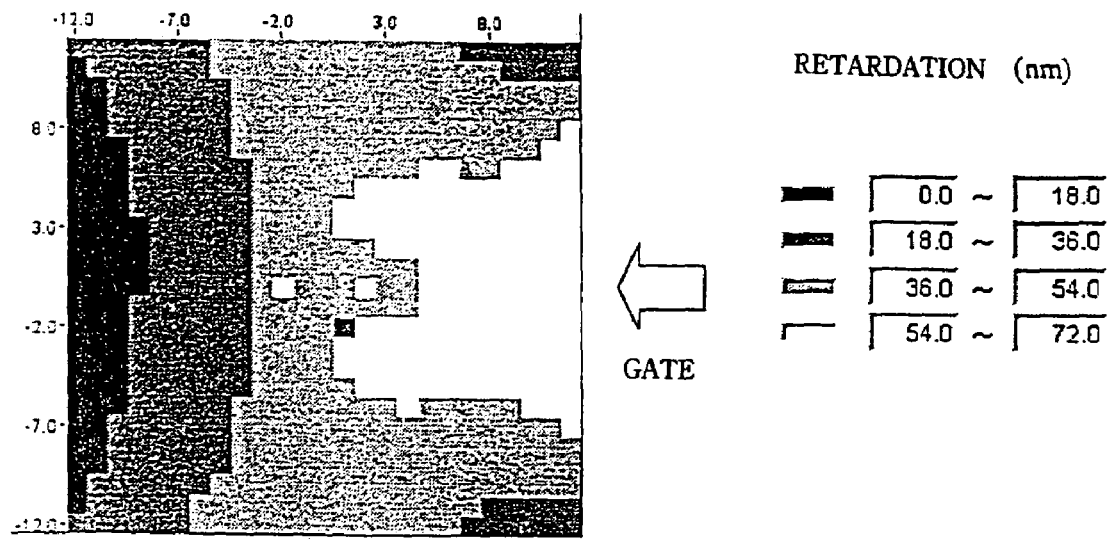
(a) ARTON
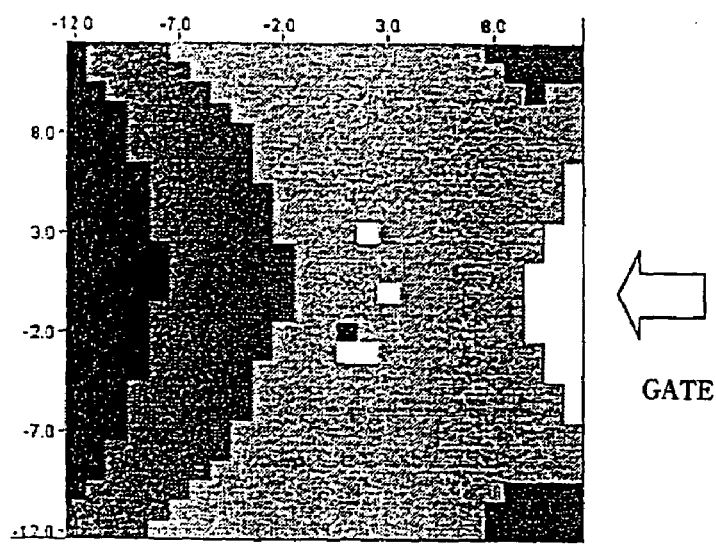
(b) NEEDLE-LIKE XONOTLITE CRYSTALS ADDED ARTON FIG. 11
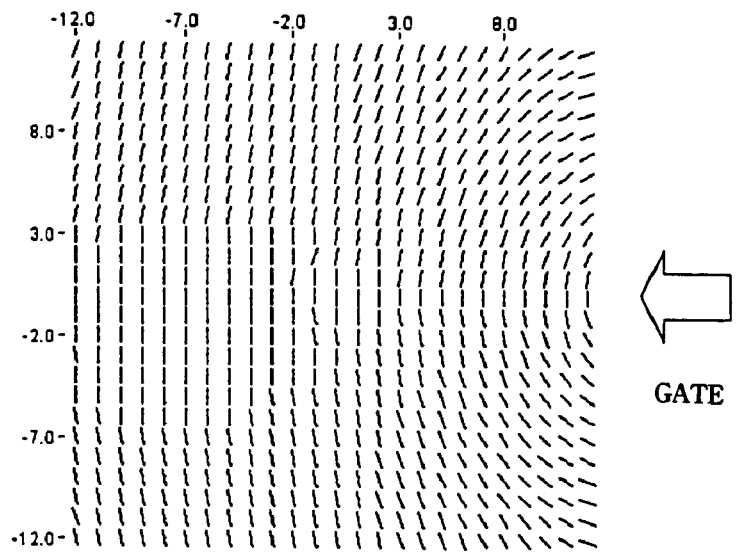
(a) ARTON
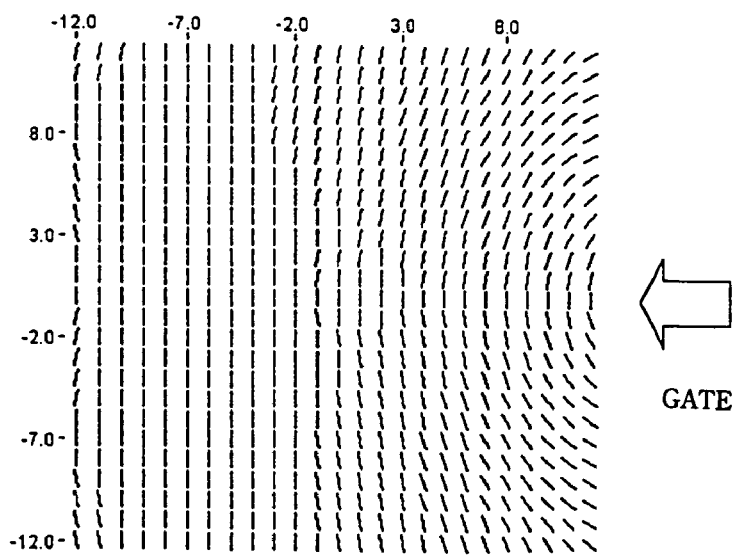
(b) NEEDLE-LIKE XONOTLITE CRYSTALS ADDED ARTON F I G. 1 2
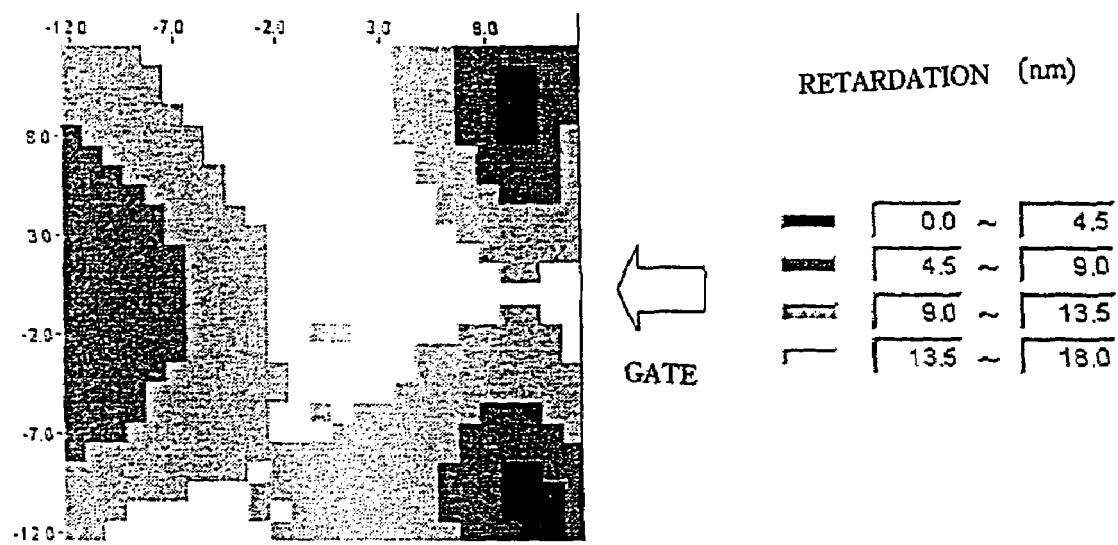
(a) POLYMETHYL METHACRYLATE
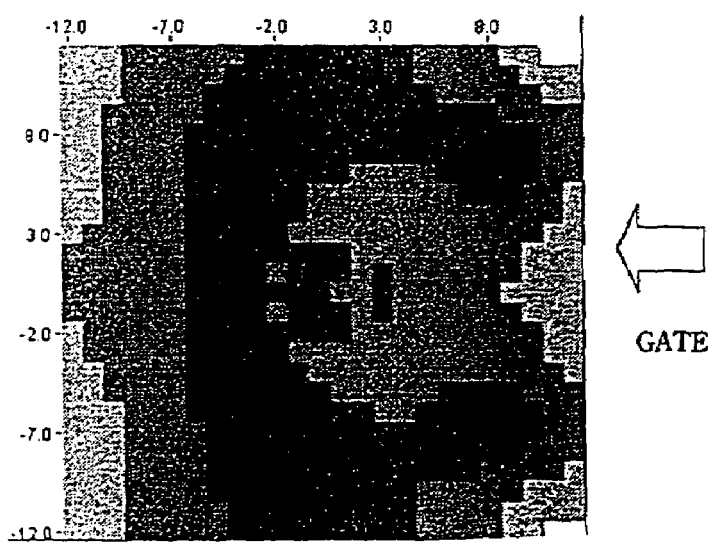
(b) NEEDLE-LIKE CALCIUM CARBONATE CRYSTALS ADDED POLYMETHYL METHACRYLATE FIG. 13
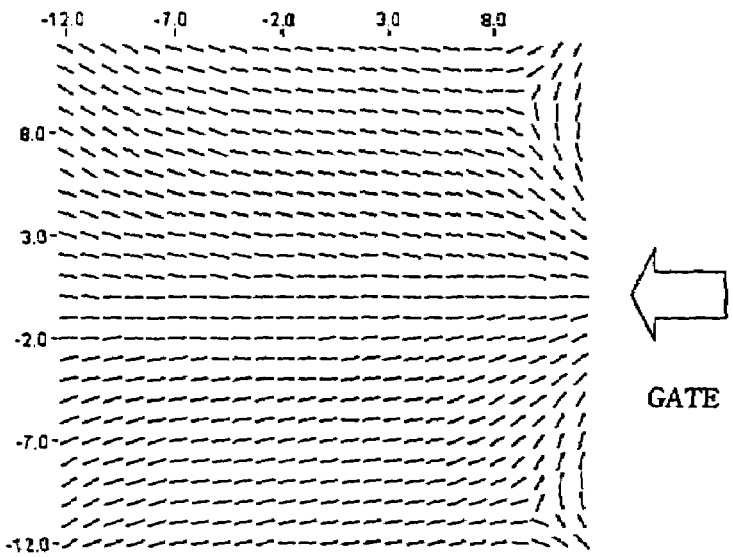
(a) POLYMETHYL METHACRYLATE
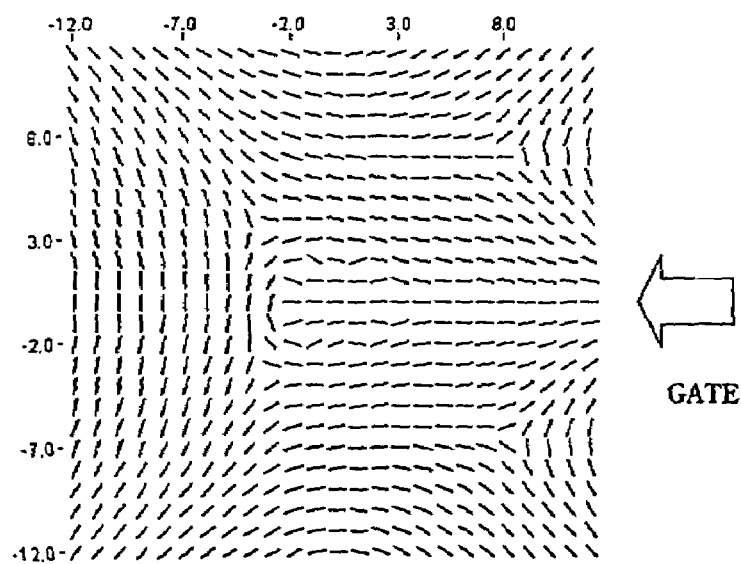
(b) NEEDLE-LIKE CALCIUM CARBONATE CRYSTALS ADDED POLYMETHYL METHACRYLATE F I G. 14
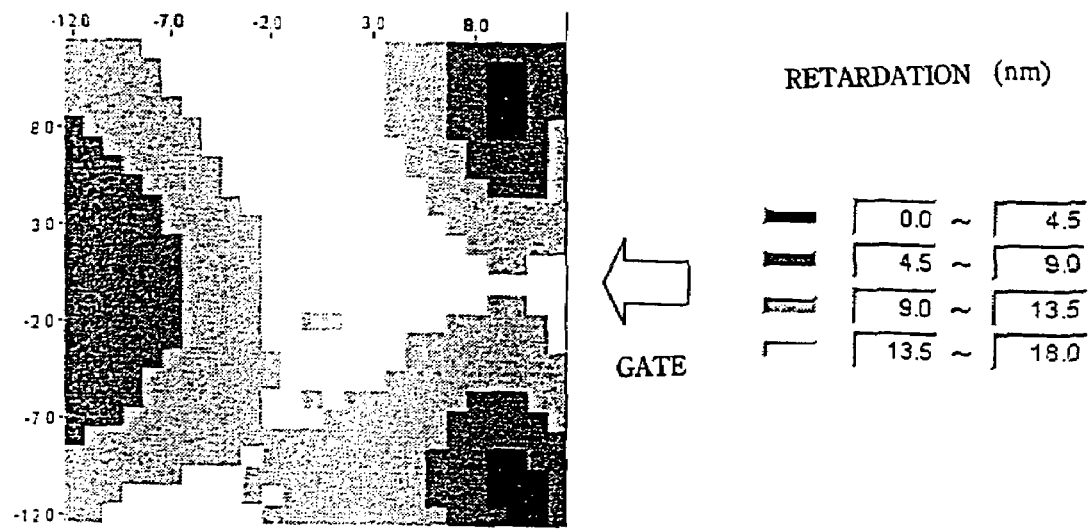
(a) POLYMETHYL METHACRYLATE
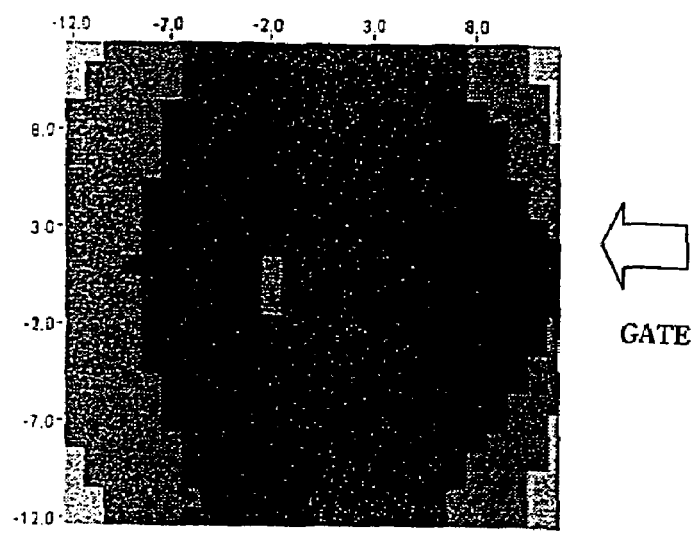
(b) NEEDLE-LIKE STRONTIUM CARBONATE CRYSTALS ADDED POLYMETHYL METHACRYLATE

FIG. 15
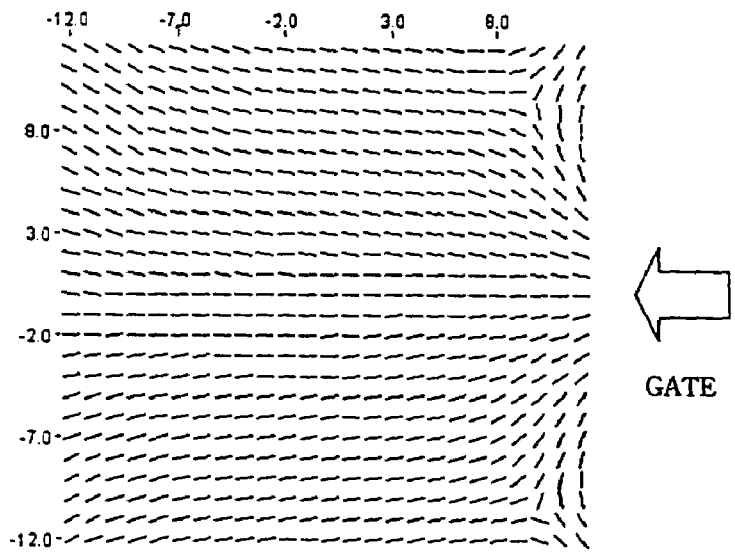
(a) POLYMETHYL METHACRYLATE
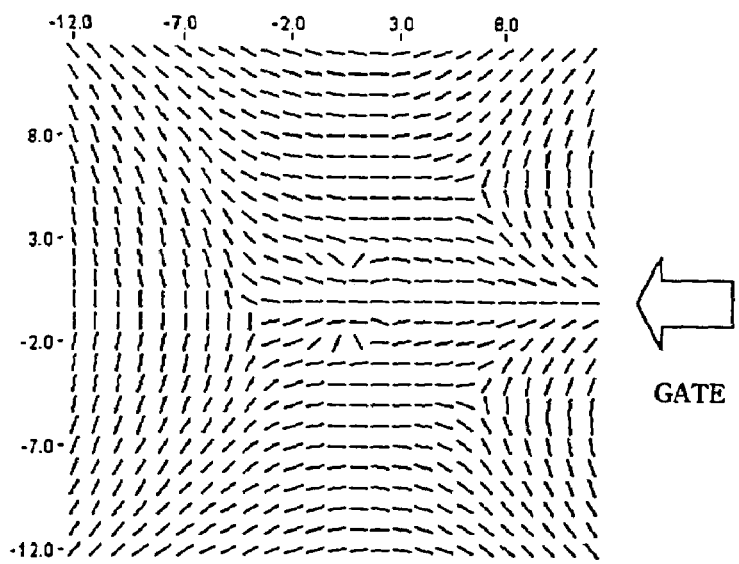
(b) NEEDLE-LIKE STRONTIUM CARBONATE CRYSTALS ADDED POLYMETHYL METHACRYLATE

NON-BIREFRINGENT OPTICAL RESIN MATERIAL AND ITS PRODUCING METHOD

FIELD OF INVENTION

The present invention relates to a non-birefringent optical resin material used for various optical elements such as lens and a method of producing thereof, in particular, to a polymer resin material suitable for optical elements, which are used in cases where polarization characteristics might lead to problems, and to a method of producing thereof. It is to be noted that the term "non-birefringent optical resin material" in the instant specification means that "optical resin material" showing a very small non-birefringence reduced when an external action (such as stress effecting during injection molding or extrusion molding) causes polymer bonding chains to be orientated.

BACKGROUND

In recent years, polymer resin. materials tend to be applied growingly to general optical components such as lenses for glasses or transparent plates, and optical components for optelectronics, in particular, such as optical components of laser-related devices like optical disk devices for recording sound, image or characters.

This is because optical materials made of polymer resins (called "polymer optical materials" sometimes hereafter) are generally lighter, lower-priced and better in workability and mass-productivity than other optical materials (such as optical glass). In particular, polymer resin materials have a significant merit that molding techniques such as injection molding or extrusion molding are applied thereto easily.

However, usually used conventional polymer optical materials show not a little birefringence when they are used in products produced by applying such molding techniques. This fact, including cause of it, is known broadly.

This is briefly illustrated in FIG. 1. In general, a polymer optical material after undergoing a molding process consists of a great number of units (monomers) 1 forming bonding chains of polymer, units 1 being bonded three-dimensionally in an orientation direction, as shown in the illustration. Then each unit (designated by numeral 1) in almost all every polymer material usually employed as optical material has an optical anisotropy regarding refractive index. That is, refractive index $n_{pr}$ for polarized wave component parallel to the orientation direction is different from refractive index $n_{vt}$ for polarized wave component perpendicular to the orientation direction.

Such an optical anisotropy can be expressed by index ellipsoid illustration as known well. According to this way of expression, index ellipsoid mark 2 is shown for each bonding unit 1 in FIG. 1. For instance, in case of polymethyl methacrylate (PMMA), each unit (methyl methacrylate) 1 has a relatively small refractive index for the orientation direction and relatively large refractive index for a direction perpendicular thereto. Therefore, macroscopically saying, index ellipsoid 3 is shaped vertically-long as illustrated. In other words, polymethyl methacrylate has a relation $n_{pr}<n_{vt}$. The difference between them $\Delta n=n_{pr}-n_{vt}$ is called "orientation birefringence value". Orientation birefringence values $\Delta n$ of actual polymer materials vary depending on degree of orientation of bonding chains (principal chains) of polymer materials. Provided that the bonding chains (principal chains) are fully extended to an ideally orientated state, orientation birefringence value $\Delta n$ gives a value called "characteristic orientation birefringence value". Characteristic orientation birefringence values of typical optical rein materials are shown in Table 1. Since characteristic orientation birefringence value is nothing other than value of $\Delta n$ under an ideal orientation condition, there is a relation $0<|\Delta n_{(real)}|<$characteristic orientation birefringence value, where $\Delta n_{(real)}$ is $\Delta n$ of a actual polymer material.

For instance, polymethyl methacrylate shown in FIG. 1 has a characteristic orientation birefringence value equal to −0.0043 and orientation birefringence value $\Delta n_{(real)}$ in the actual polymer has as relation $-0.0043<\Delta n_{(real)}<0$. It is noted that $\Delta n_{(real)}=-0.0043$ (value under an ideal orientation state) and also $\Delta n_{(real)}=0$ (value under a completely non-orientated sate) are hardly realized. In a similar way, polystyrene has a relation $-0.100<\Delta n_{(real)}<0$. Polyethylene showing a positive $\Delta n$ has a relation $0<\Delta n_{(real)}<+0.044$.

Hereafter, birefringence depending on orientation of polymer is called orientation birefringence and a direction of long axis of index ellipsoid is called orientation birefringence direction. In addition to this, "sign of birefringence is positive" means that "sign of orientation birefringence value $\Delta n_{(real)}$" or "sign of characteristic birefringence value" the same as the former is positive ($\Delta n>0$), and in the same manner, negativeness ($\Delta n<0$) corresponds to an expression such that "sign of birefringence value is negative".

TABLE 1

| SUBSTANCE | CHARACTERISTIC ORIENTATION BIREFRINGENCE VALUE; $\Delta n = n_{pr} - n_{vt}$ |
|---|---|
| POLYSTYRENE | −0.100 |
| POLYPHENYLENE OXIDE | +0.210 |
| POLYCARBONATE | +0.106 |
| POLYVINYL CHLORIDE | +0.027 |
| POLYMETHYLMETHACRYLATE | −0.0043 |
| POLYETHYLENE TEREPHTHALATE | +0.105 |
| POLYETHYLENE | +0.044 |

Such expression manner of birefringence can be applied to inorganic fine particles (crystal particles) having shapes such as needle-like shape or ellipse-like shape. If applied, $n_{pr}$ is defined as refractive index for polarized wave component parallel to the long axis of the fine particle and $n_{vt}$ is defined as refractive index for polarized wave component perpendicular to the long axis. If $\Delta n=n_{pr}-n_{vt}$ has a positive value, expression such that "sign of birefringence is positive" and if it has a negative value, expression such that "sign of birefringence is negative".

It should be noted that three axes (a-axis, b-axis and c-axis; c-axis being a long axis) corresponding to crystal structure are defined and $n_a$, $n_b$, $n_c$ are defined as refractive indexes for polarized wave components parallel with a-axis, b-axis and c-axis, respectively, since refractive index for polarized wave component perpendicular to the long axis is generally not constant. Moreover $n_{pr}$ and $n_{vt}$ are defined as $n_{pr}=n_c$ and $n_{vt}=(n_a+n_b)/2$. Concrete examples are referred to later.

Orientation-birefringence as described above are not specifically subject to problems in many cases using such optical elements as used in applications in which polarization light characteristics are not important.

To the contrary, for example, in the cases of magneto-optical disks of write/erase type developed recently, since polarized light beams are adopted as reading beam or writing beam, a birefringent optical element (such as disk itself or lens) disposed in a light path affects accuracy of reading or writing.

In usual cases other than the above example, unintentionally existing birefringence is not desirable for many optical elements. Under such background, some attempts for reducing or eliminating birefringence of optical elements. Major examples of them are as follows.

(1) Method disclosed in U.S. Pat. No. 4,373,065; This aims to obtain a non-birefringent optical resin material by blending two kinds of polymer resins which are completely soluble to each other and have signes of orientation birefringence opposite to each other.

(2) Method disclosed in Japanese Patent Laid-Open Tokkai-sho 61-19656; This utilizes an aromatic polycarbonate-type resin composite obtained by mixing aromatic polycarbonate and a specific co-polymers of styrene-type at a specific ratio.

(3) Method disclosed in Japanese Patent Laid-Open Tokkai-sho 62-240901; According to this method, non-birefringent optical resin materials are obtained from mixture of a polymer mainly composed of vinyl monomer units and a polyphenilene ether, or block co-polymer consisting of the polymer parts of both, or mixture of them.

(4) Method disclosed in Japanese Patent Laid-Open Tokkai-sho 61-108617; According to this method, two or more kinds of monomers which have positive and negative main polar coefficients not less than $50 \times 10^{-25}$ d undergo random co-polymerization, graft co-polymerization or block co-polymerization.

(5) Method disclosed in "Optics", Vol.20 Number 2pp. 80(30)-81(31), Febuary 1991; This was proposed by the instant inventor, obtaining a non-birefringent optical resin material by co-polymerizing a monomer mixture of methyl methacrylate (MMA) and trifluoroethyl methyl methacrylate (3FMA), or monomer mixture of methyl methacrylate (MMA) and methyl methacrylate (BzMA). In short, this causes monomers, which give basis for polymers opposite signs of orientation birefringence to be mixed and co-polymerized.

(6) Method disclosed in WO 01/25364; According to this method, which was also proposed by the instant inventor, numerous inorganic fine particles are dispersed in a transparent polymer is subject to an external molding force caused by drawing, with the result that bonding chains of the polymer and the numerous inorganic fine particles are orientated in approximately parallel with each other, thereby cancelling orientation birefringences of the polymer resin and inorganic fine particles. Combination of polymer resin and inorganic fine particles is chosen so that orientation birefringences of them are cancelled when bonding chains of polymer resin and inorganic fine particles (i.e. long axes of them) are orientated in parallel to each other.

However, the above (1) method blending two kinds of polymer resins requires that the polymer resins to be blended are put in molten state or solution state in order to mix them at a high uniformity. Moreover, even if such means are applied, it is very difficult to obtain a polymer resin that actually shows a low birefringence overall without ununiformity.

Still moreover, polymer resin blend composites obtained by this method can not avoid light scattering from being generated due to a natural refractive index difference of the blended polymer resins, making impossible to obtain highly transparent optical materials.

Next, in the above (2) and succeeding methods, those producing low orientation birefringence polymer resins by random copolymerization are expected in principle to provide highly transparent optical materials. However, this method causes monomers giving basis of two or more kinds of polymer reins to be mixed and copolymerized, and accordingly monomer reaction ratio of the monomers must be approximated to 1, being subject to a problem that material combinations satisfying such a condition are extremely rare.

The proposition of the above (5) includes such material combinations, one of which employs a monomer mixture of methyl methacrylate (MMA) and trifluoroethyl methyl methacrylate (3FMA) and involves a drawback that the latter material (3FMA) is extremely expensive.

Further to this, in both methods, one employing copolymerization of methyl methacrylate (MMA) and trifluoroethyl methyl methacrylate (3FMA) and the other employing copolymerization of methyl methacrylate (A) and benzil methyl methacrylate (BzMA), mixture ratio of trifluoroethyl methyl methacrylate (3FMA) or benzil methyl methacrylate (BzMA) to methyl methacrylate (MMA) must be remarkably large for preventing orientation birefringence from emerging.

Mixture ration necessary for cancelling orientation birefringence is MMA/3FMA=50/50 (wt %/wt %) in the former case and MMA/BzMA=80/20 (wt %/wt %) in the latter case. This makes impossible to give the produced materials characteristics equivalent to those of PMMA and the produced materials have mechanical characteristics and transparency inferior to those of PMMA.

Still further to this, in the case of methods utilizing graft co-polymerization included in the above (4), it is difficult to forecast-and-control quantitatively strength of resultant orientation birefringence of the synthesized resins for an employed monomer combination and it can not be judged whether products having well-cancelled orientation, birefringence are obtained or not before causing actual reactions. This makes difficult to provide industrially products having stable characteristics.

Lastly, although the above (6) method is excellent method overcoming many of the problems to which the above (1) to (5) methods subject, a combination of resin material and inorganic fine particles having signs of birefringence opposite to each other must be employed.

Moreover, according to subsequent researches by the instant inventor, it has been found that a resin material and inorganic fine particles are not orientated in some cases to the same direction under flowing conditions such as actual injection molding processes, as described later.

However, non-birefringent materials that can be produced through an injection molding process in such cases have not been developed.

DISCLOSURE OF INVENTION

Thus an object of the present invention is to provide a non-birefringent optical resin material composed of a resin material and a inorganic fine particle material which have the same sign of birefringence. Another object of the present invention is to provide a method of producing such a non-birefringent optical resin material.

The present invention provides "a non-birefringent optical resin material containing a transparent polymer resin caked after flowing and a great number of inorganic fine particles dispersed if said polymer resin; wherein said inorganic fine particles have an orientation-birefringence by which that of the polymer resin is reinforced if major axis directions of the inorganic fine particles are parallel with an orientation direction of bonding chains of said polymer resin and is cancelled if major axis directions of the inorganic fine particles are perpendicular to the orientation direction of bonding chains of said polymer resin, and said bonding chains of said polymer resin orientated to an orientation direction corresponding to an external force acted in said flowing, and said a great number of inorganic fine particles are orientated approximately perpendicular to said orientation direction of said bonding chains, thereby giving a non-birefringence to said optical resin material", as a non-birefringent optical resin material realizing the above technical object.

It is noted that said flowing may be caused when a material containing said resin material in a molten state and said great number of inorganic fine particles is injected into a flowing space having a relatively large cross section through an opening having a relatively small cross section.

The present invention also provides "a method of producing a non-birefringent optical resin material containing a transparent polymer resin caked after flowing and a great number of inorganic fine particles dispersed if said polymer resin, wherein said inorganic fine particles have an orientation-birefringence by which that of the polymer resin is reinforced if major axis directions of the inorganic fine particles are parallel with an orientation direction of bonding chains of said polymer resin and is cancelled if major axis directions of the inorganic fine particles are perpendicular to the orientation direction of bonding chains of said polymer resin, comprising the steps of; causing a great number of inorganic fine particles to coexist with and dispersed in a transparent polymer resin in a flowing state, thereby orientating said bonding chains of said polymer resin to a direction in correspondence to that of said flowing and orientating said great number of inorganic fine particles to approximately perpendicular to a direction of said flowing; and, fixing a relation between orientation of bonding chain of said polymer resin and that of said inorganic fine particles through a caking process", as a method of producing a non-birefringent optical resin material realizing the above technical object.

It is noted that said flowing state is caused in a flowing space when a material containing said resin material in a molten state and said great number of inorganic fine particles is injected into said flowing space having a relatively large cross section through an opening having a relatively small cross section.

Although the instant inventor has found in foresaid (6) technique that a composition of polymer resin material and inorganic fine particles added thereto, which have a sign of birefringence effect opposite to that of the polymer resin material, brings a birefringence cancelling relation to them and a non-birefringent optical resin material is obtained, the present invention seems to rely on an idea that seems to contradict this.

That is, the present invention is based on a novel knowledge that a combination of a transparent polymer resin material and inorganic fine particles having the same sign of birefringence can provide a non-birefringent optical resin material. For instance, to a polymer optical material having a negative sign orientation birefringence (example; polymethyl methacrylate, polystyrene), inorganic fine particles index for a long-direction of each of which is smaller than index for a direction perpendicular thereto are chosen. Inversely, to a polymer optical material having a positive sign orientation birefringence (example; polycarbonate, polyethylene terephthalate), inorganic fine particles index for a long-direction of each of which is smaller than index for a direction perpendicular thereto are chosen.

If a direction of bonding chains of the resin material and an orientation direction of the inorganic fine particles represented by the long axis in such a combination are fixed in a state generally vertical to each other, orientation birefringences of both will be cancelled to each other. Such an orientation relation can be realized by caking a molten resin material containing inorganic fine particles dispersed therein after being injected and flown into a flowing space having a relatively large cross section through an opening having a relatively small cross section.

FIG. 2 illustrates a principle of this. In the illustration, numeral 4 designates a molding used for injection molding on a side of which gate 5 is provided. Needless to say, gate 5 has a much smaller cross section as compared with that of mold 4. As known well, when injection molding is performed by using such a molding, molten resin material is injected from gate 5 and a molded product is taken out by opening the molding after being cooled and caked.

Seeing the flow of resin material in mold 4, it flows as to get remote from gate 5 while generally making a radially expanding flow. Equiphase faces of the flow (flow ends) as designated by numerals 6 to 9 are formed.

Therefore, the molten resin material flowing from gate 5 has a velocity vector (three-dimension) having not only a straight-ahead component S but also components P and R vertical thereto. It is known that bonding chains of resin material are orientated approximately to a direction of velocity vector. Now paying attention to points A and B distant to some extent from each other on equiphase 7, bonding chains of resin material in the vicinity of point A are orientated roughly to a direction connecting an exit of gate 5 and point A and bonding chains of resin material in the vicinity of point B are orientated roughly to a direction connecting an exit of gate 5 and point B.

This phenomenon occurs in a similar way even when inorganic fine particles of a shape having a long axis such as rod-like shape or elliptic shape are dispersed in a molten resin material unless the inorganic fine particles have an extremely high density. On the other hand, each of the inorganic fine particles of a shape having a long axis is caused to be orientated depending on the surrounding resin material flow if sizes of the inorganic fine particles fall roughly in a range from light wavelength (several hundred nm) to several ten micron.

Considering the resin material flow microscopically, the bonding chains are expected to form units (clusters) each of which consist of bonding chains moving cooperatively to some extent.

However, the units are supposed to be about several ten Angstrom at most in size. Therefore, viewing in a much greater scale such as several hundred nm to several ten micron or more, the material flows and moves with velocity vectors (three-dimension) different from each other overall within the molding. Thus flowing velocity has a gradient around a fine particle, in particular, at both particle ends of a long axis direction an external force is generated depending on the long axis direction, with the result that a moment is generated.

It is supposed that this moment acts as to orientate the fine particle so that external forces acting on the particle both ends of the long axis direction have approximately equal components perpendicular to the long axis direction (Moment is eliminated under such an orientation). According to this, it is supposed that the fine particles tend t to be orientated so that their long axes are directed roughly in parallel with equiphases 69 to 9.

Reminding that bonding chains of the resin material are orientated roughly vertical to equiphases 6 to 9, a resultant tendency is, after all, such that orientation direction of bonding chains of the resin material is roughly perpendicular to that of the long axis directions of the fine particles, with that result that a non-birefringent material is obtained, if both have the same orientation birefringence sign, since orientation birefringence is cancelled mutually on the whole material.

It is noted that "being orientated to a direction" of bonding chains or numerous inorganic fine particles does not mean all of the bonding chains or all of the numerous inorganic fine particles are orientated to the direction, in the instant specification, but meaning that major number of bonding chains or inorganic fine particles are orientated approximately to the direction from a statistical point of view.

BRIEF DESCRIPTION OF DRAWINGS

FIG. 6 illustrates shape and dimension of non-birefringent resin plates produced in Embodiment 1 to Embodiment 4 and reference samples;

FIG. 7(a) is a retardation map illustrating measured degree of retardation shown by a reference sample in connection with Embodiment 1 and FIG. 7(b) is a retardation map illustrating measured degree of retardation shown by a non-birefringent resin plate sample obtained in Embodiment 1;

FIG. 8(a) is an advancing phase axis map illustrating measured direction of retardation (i.e. direction of advancing phase axis) shown by a reference sample in connection with Embodiment 1 and FIG. 8(b) is an advancing phase axis map illustrating measured direction of retardation (i.e. direction of advancing phase axis) shown by a non-birefringent resin plate sample obtained in Embodiment 1;

FIG. 10(a) is a retardation map illustrating measured degree of retardation shown by a reference sample in connection with Embodiment 2 and FIG. 10(b) is a retardation map illustrating measured degree of retardation shown by a non-birefringent resin plate sample obtained in Embodiment 2;

FIG. 11(a) is an advancing phase axis map illustrating measured direction of retardation (i.e. direction of advancing phase axis) shown by a reference sample in connection with Embodiment 2 and FIG. 11(b) is an advancing phase axis map illustrating measured direction of retardation (i.e. direction of advancing phase axis) shown by a non-birefringent resin plate sample obtained in Embodiment 2;

FIG. 12(a) is a retardation map illustrating measured degree of retardation shown by a reference sample in connection with Embodiment 3 and FIG. 12(b) is a retardation map illustrating measured degree of retardation shown by a non-birefringent resin plate sample obtained in Embodiment 3;

FIG. 13(a) is an advancing phase axis map illustrating measured direction of retardation (i.e. direction of advancing phase axis) shown by a reference sample in connection with Embodiment 3 and FIG. 13(b) is an advancing phase axis map illustrating measured direction of retardation (i.e. direction of advancing phase axis) shown by a non-birefringent resin plate sample obtained in Embodiment 3;

FIG. 14(a) is a retardation map illustrating measured degree of retardation shown by a reference sample in connection with Embodiment 4 and FIG. 14(b) is a retardation map illustrating measured degree of retardation shown by a non-birefringent resin plate sample obtained in Embodiment 4;

FIG. 15(a) is an advancing phase axis map illustrating measured direction of retardation (i.e. direction of advancing phase axis) shown by a reference sample in connection with Embodiment 4 and FIG. 15(b) is an advancing phase axis map illustrating measured direction of retardation (i.e. direction of advancing phase axis) shown by a non-birefringent resin plate sample obtained in Embodiment 4;

BEST MODE OF EMBODIMENT

As described above, the present invention utilizes "inorganic fine particles having birefringence", which functions as to cancel or reduce birefringence with which a transparent resin matrix provided. Now described is birefringence of inorganic fine particles by referring to actual examples.

As known well, general inorganic crystals can be classified according to symmetric property of unit lattice composing them into crystal systems, such as tetragonal system, orthorhombic system. Some of broadly known substances has a conventional name for every crystal system.

An inorganic fine particle is composed of some unit number of inorganic crystals gathered together. It should be noted that what form of outward figure is provided when actually gathered crystals compose a fine particle is not determined uniquely depending on crystal system.

In other words, various outward figures appear depending circumstance under which units composing crystals are accumulated and grow. However, many substances have forms easy to appear under usual crystal growing conditions, which are called "crystal mannerisms".

For example, calcium carbonate can provide three crystal systems, calcite, paterite and aragonite. It is known that, in these, calcite is usually obtained under usual temperature and usual pressure and aragonite is obtained preferentially if crystals are grown under existence of a certain impurity (or catalyst).

Figure 1:
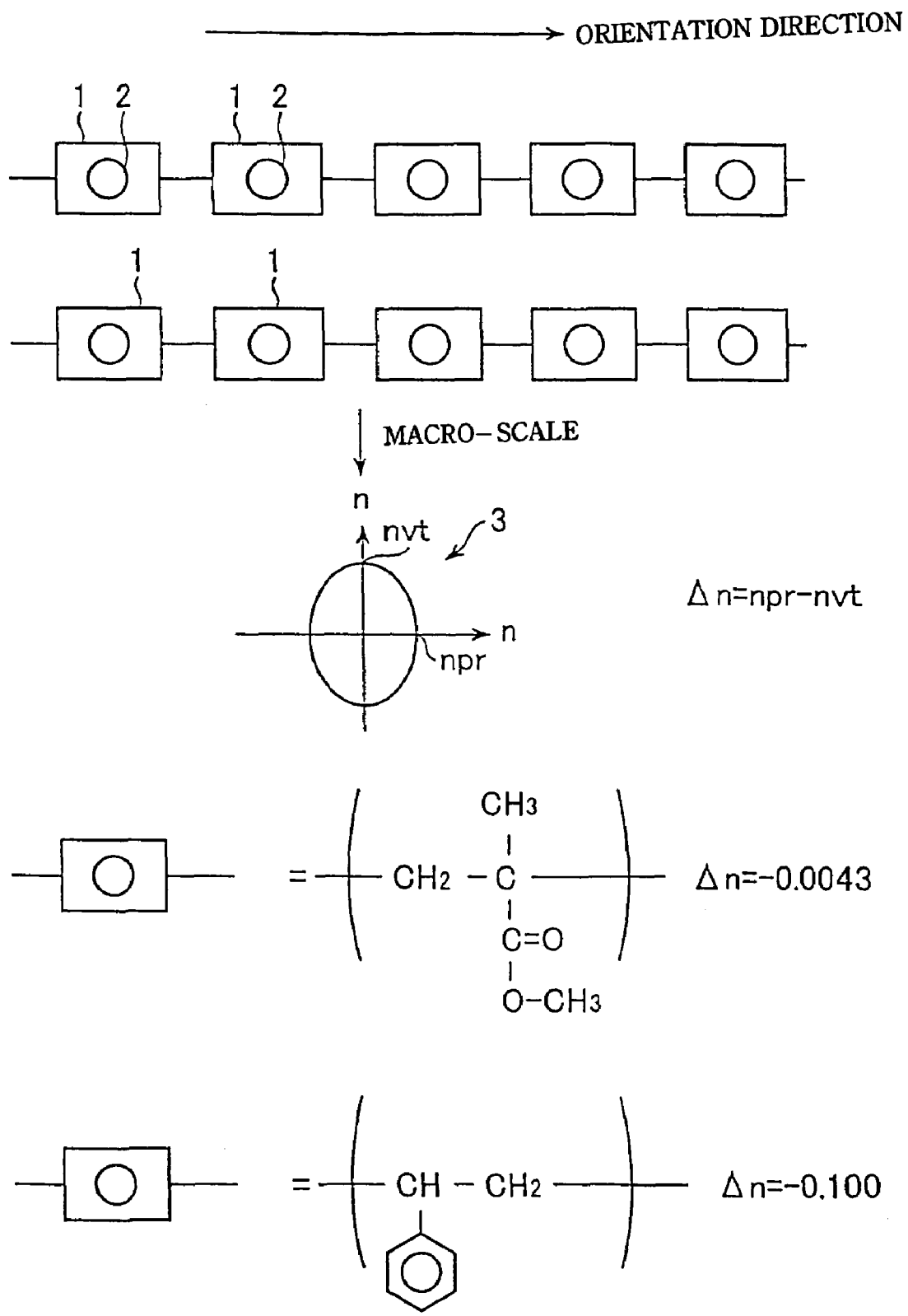
FIG. 1 is a diagram illustrating birefringence that an orientated polymer material shows.
Figure 2:
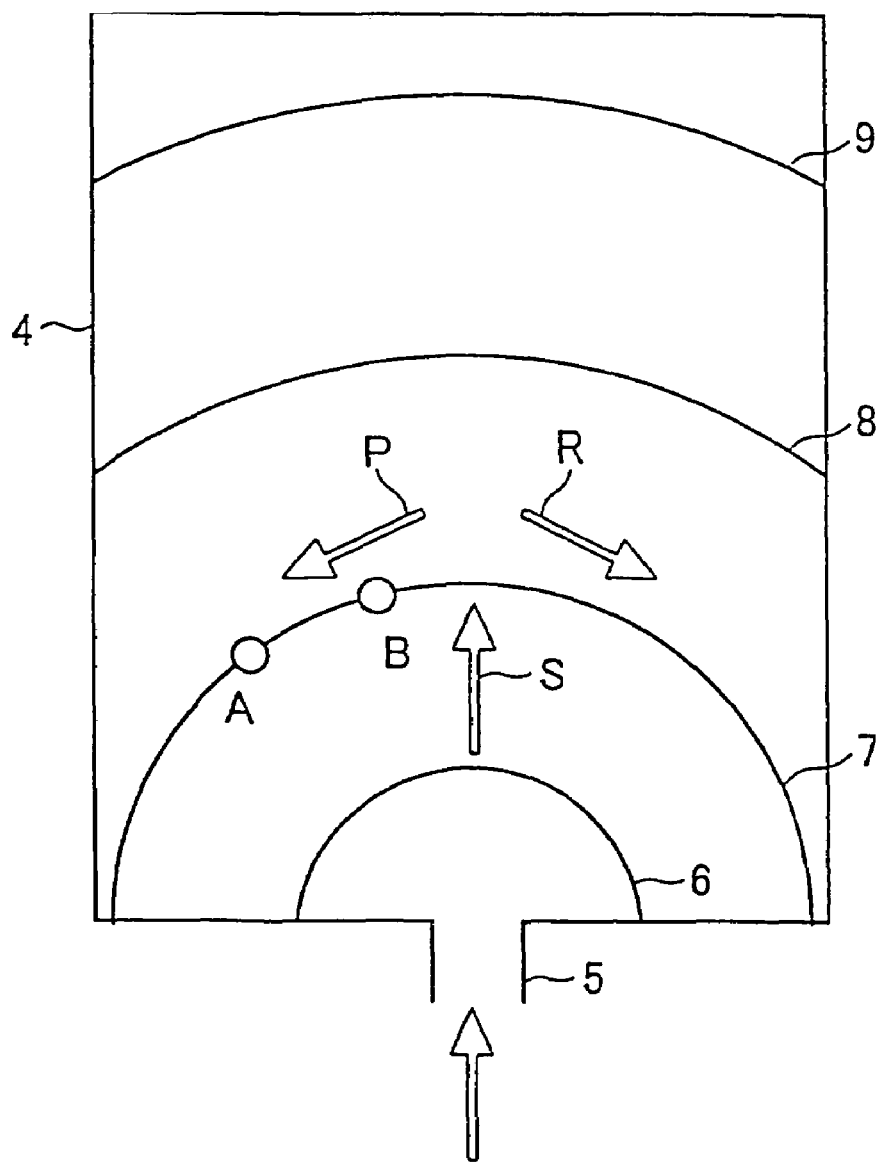
FIG. 2 is a diagram illustrating a principle for orientating bonding chains of polymer and inorganic fine particles in generally perpendicular directions to each other.
Figure 3:
FIG. 3 is a microscopic picture of aragonite that have an outward appearance of rod-like inorganic fine particles.

Aragonite have a crystal mannerism providing a rod-like form, as shown in a microscopic picture of FIG. 3 that shows rod-like fine particles. This form is called also "needle-like" or "whisker-like".

As disclosed, for instance, in Japanese Patent 2684112, industrial mass production can be applied to rod-like aragonite type calcium carbonate. Some substances other than calcium carbonate have crystal mannerisms forming such rod-like fine particles.

Figure 4:
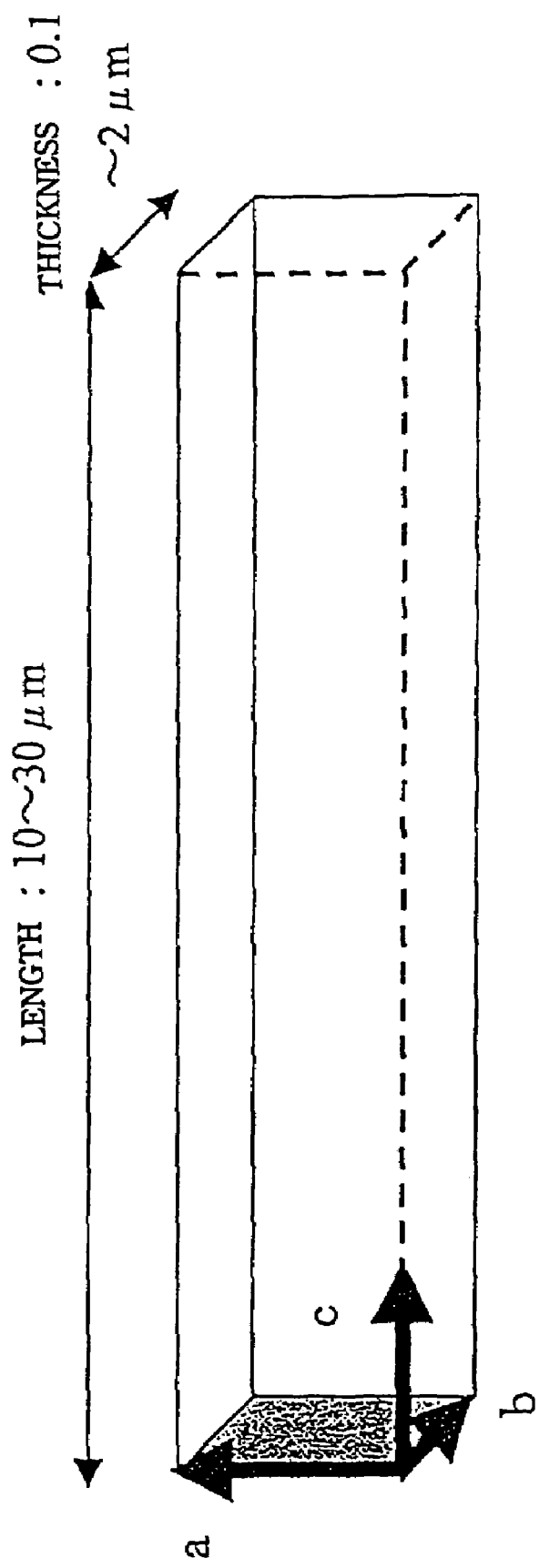
FIG. 4 is a schematic view of a rod-like inorganic fine particle of ones shown in FIG. 3.

FIG. 4 is a schematic view of a rod-like fine particle of ones shown in FIG. 3. Particle size ranges, for example, from 10 μm to 30 μm in length and from 0.1 μm to 2 μm in thickness.

Long axis direction of rod generally accords with c-axis of the crystal system. Both a-axis and b-axis give short axis directions.

Figure 5:
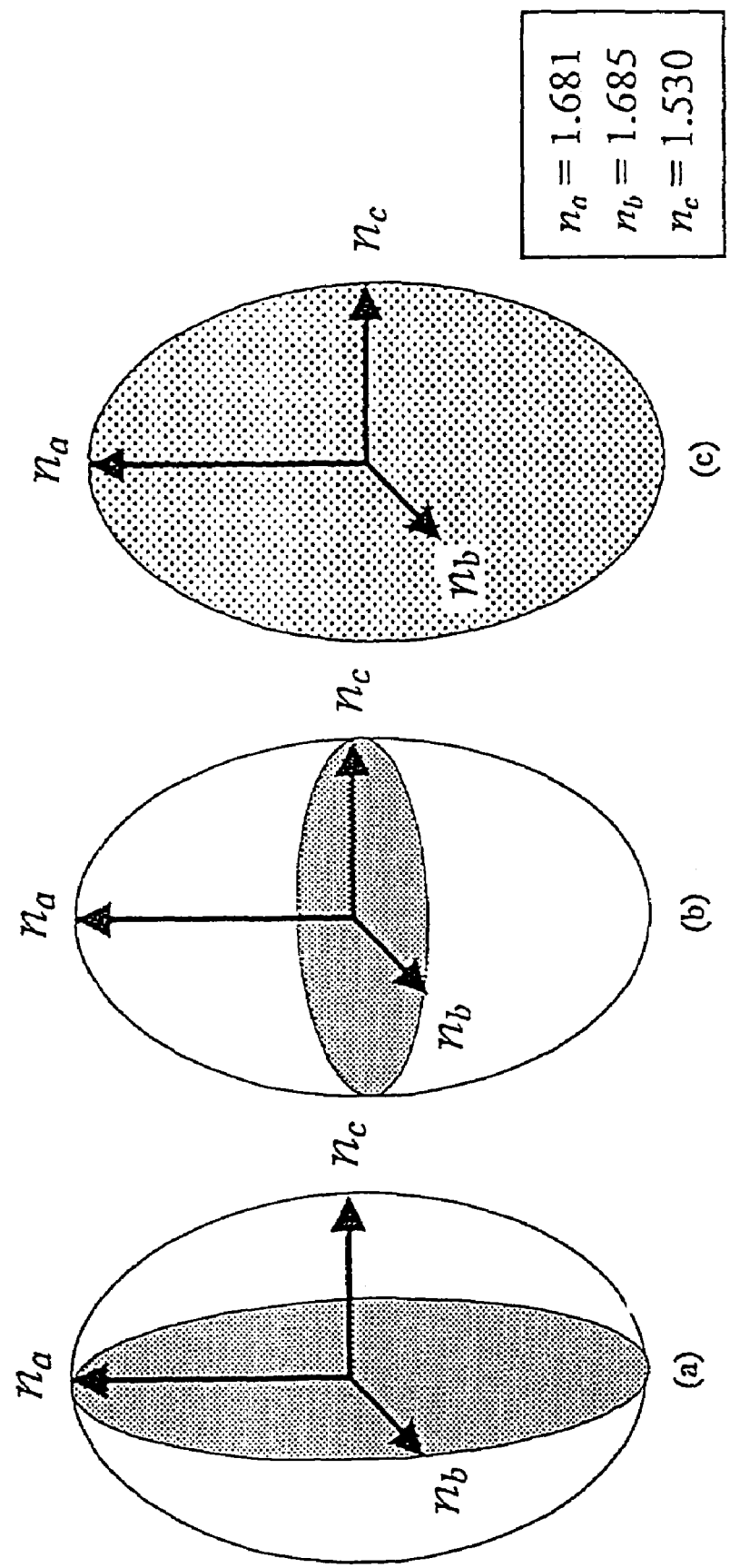
FIGS. 5(a), (b) and (c) illustrate birefringence of an aragonite crystal, showing cross sections of an index ellipsoid to illustrate refractive index effective to an incidence light along c-axis in FIG. 5(a), that effective to an incidence light along a-axis in FIG. 5(b) and that effective to an incidence light along b-axis in FIG. 5(c), respectively.

Aragonite, made of birefringent crystals, has birefringence which can be expressed by an index ellipsoid as shown in FIGS. 5(a), 5(b) and 5(c). As known well, birefringence means anisotropy in refractive index which is illustrated by the index ellipsoid three-dimensionally. In each of FIGS. 5(a), 5(b) and 5(c), arrows (coordinate axes) designated by symbols $n_a$, $n_b$ and $n_c$ correspond to a-axis, b-axis and c-axis of the crystal, respectively.

Respective refractive index components for the respectively corresponding axis are expressed by respective distances between the origin and points (three points in total) at which the index ellipsoid (three-dimensional) and the respectively corresponding coordinate axes intersect. For the sake of convenience, $n_a$, $n_b$ and $n_c$ are also employed as symbols expressing their values. Aragonite gives $n_a$=1.681, $n_b$=1.685, $n_c$=1.530. Accordingly, foresaid index Δn expressing birefringence is given by $\Delta n = n_{pr} - n_{vt} = n_c - (n_a + n_b)/2 = 1.530 - (1.681 + 1.685)/2 = 1.530 - 1.683 = -0.147$.

It is noted that effective refractive indexes are shown for respectively corresponding light propagation directions by means of the ellipse (cross sections of ellipse) in FIGS. 5(a), 5(b) and 5(c). FIG. 5(a) illustrates a case where light propagates from the left side to the right side in the illustration, namely, to a +−direction along $n_c$ axis (corresponding to c-axis direction), and effective refractive index for the light is expressed by a cross section (shaded; called ellipse ab hereafter) which cuts the ellipse with a plane that passes the center of the ellipse (i.e. the origin at which $n_a$, $n_b$ and $n_c$ intersect) and extends perpendicularly to the light propagating direction.

Needless to say, light is a longitudinal wave having an electric field vibration component perpendicular to the light propagation direction. Therefore, under the condition (propagation toward +$n_c$ direction) shown in FIG. 5(a), the electric field vibration component is parallel with the plane represented by ellipse ab. Provided linearly polarized light propagates, there are (11) polarized light having an electric field vibrating in $n_a$ direction, (12) polarized light having an electric field vibrating in $n_b$ direction and (13) polarized light having an electric field vibrating in a direction between $n_a$ direction and $n_b$ direction, wherein (13) can be regarded as superposition of (11) and (12). So-called natural light contains (11), (12) and (13) together.

In a similar manner, in the case of FIG. 5(b) showing that light propagates to a +− direction along $n_a$ axis (corresponding to a-axis direction), effective refractive index for the light is expressed by a cross section (called ellipse bc hereafter) which cuts the ellipse with a plane that passes the center of the ellipse (i.e. the origin) and extends perpendicularly to a-axis.

Under FIG. 5(b) condition (propagation toward +$n_a$ direction), an electric field vibration component is parallel with a plane represented by ellipse bc. Provided linearly polarized light propagates, there are (21) polarized light having an electric field vibrating in $n_b$ direction, (22) polarized light having an electric field vibrating in $n_c$ direction and (23) polarized light having an electric field vibrating in a direction between $n_b$ direction and $n_c$ direction, wherein (23) can be regarded as superposition of (21) and (22). So-called natural light contains (21), (22) and (23) together.

Next, in the case of FIG. 5(c) showing that light propagates to a +−direction along $n_b$ axis (corresponding to b-axis direction), effective refractive index for the light is expressed by a cross section (called ellipse ca hereafter) which cuts the ellipse with a plane that passes the center of the ellipse (i.e. the origin) and extends perpendicularly to b-axis.

Under FIG. 5(c) condition (propagation toward +$n_b$ direction), an electric field vibration component is parallel with a plane represented by ellipse ca. Provided linearly polarized light propagates, there are (31) polarized light having an electric field vibrating in $n_c$ direction, (32) polarized light having an electric field vibrating in $n_a$ direction and (33) polarized light having an electric field vibrating in a direction between $n_c$ direction and $n_a$ direction, wherein (33) can be regarded as superposition of (31) and (32). So-called natural light contains (21), (22) and (23) together.

Aragonite birefringence is outlined as above, giving a Δn value of −0.147 (negative value). Various fine particles having long axes as above, other than aragonite, also show birefringence, some of them showing Δn>0. Upon employing such fine particles for cancelling birefringence index of resin matrix in accordance with the present invention, combination is chosen so that Δn of resin and that of inorganic fine particles have the same sign.

As describe previously, in order to generate non-birefringence by cancelling orientation birefringence of rein and inorganic fine particles mutually under such combination, an orientation direction of bonding chains of the resin material and that of inorganic fine particles represented by long axis direction are fixed in a state in which both directions are approximately perpendicular to each other.

For realizing this, a molten resin material in which inorganic fine particles are dispersed is injected into a flowing space having a relatively large cross section through an opening having a relatively small cross section, then being caked. As described already, a material having non-birefringence is obtained by this method.

Concrete examples, Embodiments 1 to 4, are described as follows.

Embodiment 1

Kneading was applied to needle-like crystals of basic magnesium sulfate $MgSO_4 \cdot 5Mg(OH)_2 \cdot 3H_2O$ (By UBE MATERIALS Ltd.; MOSH•IGE (Registered Trade Mark)) ranging 7 μm to 10 μm and transparent rein ARTON (Registered Trade Mark; JSR Ltd.) by means of a double-axle extruder to obtain pellets.

Density of the added basic magnesium needle-like crystals was 0.5 parts by weight to 100 parts of ARTON. Injection molding was applied to the pellets by means of an injection molding machine (NISSEI JUSHI KOGYO Ltd.; Type HM-7) to prepare a flat plate-like (35 mm×35 mm×2 mm) molding as shown in FIG. 6. In other words, the above molten resin containing the above inorganic fine particles dispersed therein was injected (poured) into a mold 4 having a shape like that shown in FIG. 6 through a gate, then a plate-like sample being taken out by mold-opening after being cooled and caked. Injection molding condition was such that nozzle temperature was 280° C., cylinder temperature 280° C., and mold temperature 90° C.

Plane-distribution of degree and direction of retardation (birefringence value Δn×light path length) of the prepared flat plate-shaped sample was measured by means of a birefringence measuring apparatus (By UNIOPT Ltd.; automatic birefringence measuring apparatus, ABR-10A-EX).

Results are shown in FIGS. 7(b) and 8(b). The same measurement was applied to a reference sample and results were shown in FIGS. 7(a) and 8(a). The reference sample was a resin plate having the same size and same shape as shown in FIG. 6 which was prepared by applying injection molding to ARTON (Registered Trade Mark) containing no basic magnesium needle like crystal under the same condition.

Measurement was performed by utilizing a laser light transmitting through the flat plate-shape sample or reference sample in a plate thickness direction. According to this, retardation maps shown in FIGS. 7(*a*) and 7(*b*) illustrate retardation values of the light transmitting a plane surrounded by sides of 35 mm approximately perpendicularly for every 1 by 1 mm square segment.

Figure 9:
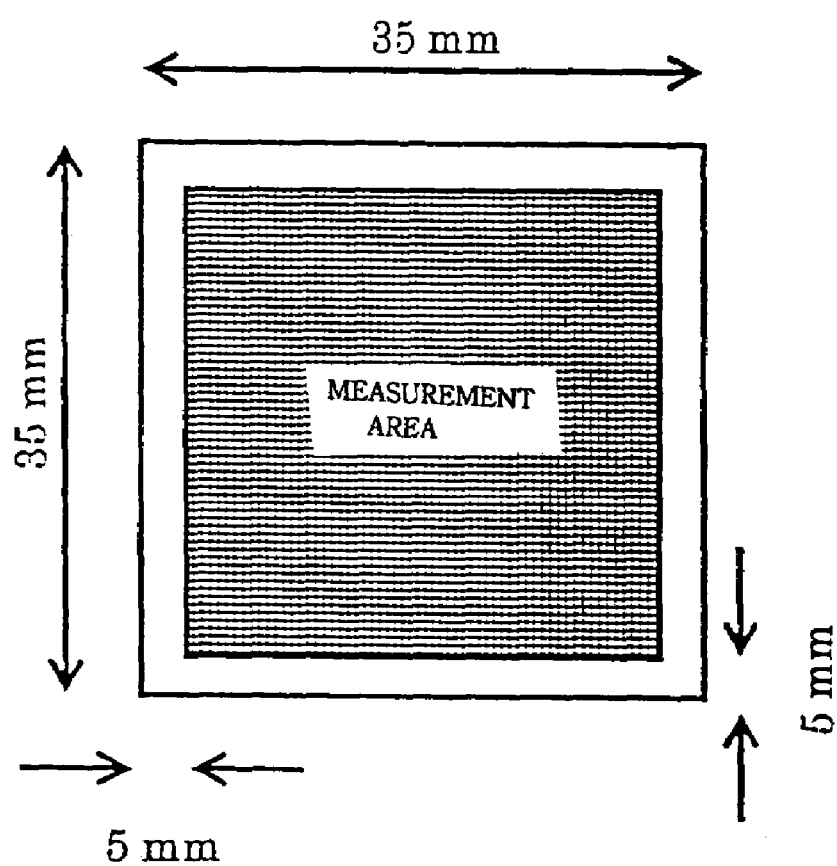
FIG. 9 is a diagram illustrating a measurement region employed in measurements of retardation (degree and direction) of the reference samples and non-birefringent resin plates employed in Embodiment 1 to Embodiment 4.

Edge portion ranging about 5 mm from the periphery was excluded from a meshed measurement area as shown in FIG. 9 in order to prevent effects of refraction and diffraction of the light from bringing errors.

A direction to which the smallest refractive index is provided for polarized light incident perpendicularly to each segment is defined as "advancing phase axis" and another direction vertical thereto which the largest refractive index is provided is defined as "delaying phase axis", and the phase difference between the polarized lights in the respective directions was calculated as retardation for each segment.

FIGS. 8(*a*) and (*b*) are advancing phase axis maps, in which a linear line in each segment shows an advancing phase axis direction and a direction perpendicular thereto is a delaying phase axis direction. Degree of retardation is expressed stepwise by shading in each retardation map.

A portion the nearest to the gate position of the employed mold generally corresponds to the middle of the right side end in each of retardation maps shown in FIGS. 7(*a*) and 7(*b*). In other words, molten polymer flows into the mold from the right side, heading for the left side. It is noted that the gate has a cross section which is, needless to say, much smaller than that of the mold at positions along the resin flow (approximately equal to cross section of the plate-like sample).

Referring to FIG. 8(*a*) showing an advancing phase axis map, advancing phase axes (directions giving a small refractive index) are directed, in the position corresponding to the gate, as to disposed along circumferences of concentric circles provisionally depicted from the position corresponding to the gate. Delaying phase axes (directions giving a large refractive index) are directed perpendicularly to advancing phase axes, being directed radially from the gate position.

Since ARTON has a positive orientation birefringence (that is, refractive index for an orientation direction of polymer principal chains is larger than for a direction perpendicular thereto), principal chains of ARTON are orientated radially from the position corresponding to the gate.

In a similar manner, an orientation direction of ARTON at each part of the samples. It is to be noted that average is shown for the whole thickness and some portions have thin layer region near to the surface within which orientation directions are different from those portions inside thereof. However, it can be said statistically that almost all parts excepting the surface layer are orientated to the above-described directions.

Now comparing FIG. 7(*a*) with FIG. 7(*b*), it is understood that ARTON to which needle-like basic magnesium sulfate crystals added gives the whole sample a smaller retardation.

Comparing FIG. 8(*a*) with FIG. 8(*b*), it is understood that directions of advancing phase axes are different by 90° from each other at the most distant position from the position corresponding to the gate.

Orientation state of needle-like crystals inside of an injection molding product was observed by means of an optical microscope, and it was confirmed that orientation was directed, in the vicinity of the position corresponding to the gate, as to disposed along circumferences of foresaid concentric circles and, at the most distant position from the gate position, is directed vertical to advancing phase axes shown in FIG. 8(*b*) (in a direction along delaying phase axes).

This means that successful cancelling of positive orientation birefringence of ARTON polymer is achieved by orientating needle-like basic magnesium sulfate having long-axis-direction-refractive-index large than short-axis-direction-refractive-index to a direction approximately vertical to the polymer principal chains (bonding chains).

Embodiment 2

Kneading was applied to needle-like crystals of Xonotlite $6CaO \cdot 6SiO_2 \cdot H_2O$ (By UBE MATERIALS Ltd.; SONO•HIGE (Registered Trade Mark)) ranging 1 μm to 7 μm and transparent rein ARTON (Registered Trade Mark; JSR Ltd.) by means of a double-axle extruder to obtain pellets.

Density of the added xonotlite needle-like crystals was 0.5 parts by weight to 100 parts of ARTON.

Injection molding was applied to the pellets by means of an injection molding machine (NISSEI JUSHI KOGYO Ltd.; Type HM-7) to prepare a flat plate-like (35 mm×35 mm×2 mm) molding as shown in FIG. 6. In other words, the above molten resin containing the above inorganic fine particles dispersed therein was injected (poured) into a mold 4 having a shape like that shown in FIG. 6 through a gate, then a plate-like sample being taken out by mold-opening after being cooled and caked.

Injection molding condition was such that nozzle temperature was 280° C., cylinder temperature 280° C., and mold temperature 90° C.

Plane-distribution of degree and direction of retardation (birefringence value Δn×light path length) of the prepared flat plate-shaped sample was measured by means of a birefringence measuring apparatus (By UNIOPT Ltd.; automatic birefringence measuring apparatus, ABR-10A-EX).

Results are shown in FIGS. 10(*b*) and 11(*b*). The same measurement was applied to a reference sample and results were shown in FIGS. 10(*a*) and 11(*a*). The reference sample was a resin plate having the same size and same shape as shown in FIG. 6 which was prepared by applying injection molding to ARTON (Registered Trade Mark) containing no inorganic fine particles under the same condition.

Measurement was performed by utilizing a laser light transmitting through the flat plate-shape sample or reference sample in a plate thickness direction. According to this, retardation maps shown in FIGS. 10(*a*) and 10(*b*) illustrate retardation values of the light transmitting a plane surrounded by sides of 35 mm approximately perpendicularly for every 1 by 1 mm square segment.

Edge portion ranging about 5 mm from the periphery was excluded from a meshed measurement area as shown in FIG. 9 in order to prevent effects of refraction and diffraction of the light from bringing errors, in the same manner as in Embodiment 1.

A direction to which the smallest refractive index is provided for polarized light incident perpendicularly to each segment is defined as "advancing phase axis" and another direction vertical thereto which the largest refractive index is provided is defined as "delaying phase axis", and the phase difference between the polarized lights in the respective directions was calculated as retardation for each segment.

FIGS. 11(*a*) and (*b*) are advancing phase axis maps, in which a linear line in each segment shows an advancing phase axis direction and a direction perpendicular thereto is a delaying phase axis direction. Degree of retardation is expressed stepwise by shading in each retardation map.

A portion the nearest to the gate position of the employed mold generally corresponds to the middle of the right side end in each of retardation maps shown in FIGS. 7(a) and 7(b). In other words, molten polymer flows into the mold from the right side, heading for the left side. It is noted that the gate has a cross section which is, needless to say, much smaller than that of the mold at positions along the resin flow (approximately equal to cross section of the plate-like sample).

Referring to FIGS. 10(a), (b) showing retarding maps and FIGS. 11(a), (b) showing an advancing phase axis maps, tendency similar to that in the case of Embodiment 1 can be confirmed.

Namely, it is understood that ARTON to which xonotlite needle-like crystals added gives the whole sample a smaller retardation.

Orientation state of needle-like crystals inside of an injection molding product was observed by means of an optical microscope, and it was confirmed that orientation was directed, in the vicinity of the position corresponding to the gate, as to disposed along circumferences of foresaid concentric circles and, at the most distant position from the gate position, is directed along advancing phase axes shown in FIG. 11(b).

This means that successful cancelling of positive orientation birefringence of ARTON polymer is achieved by orientating needle-like xonotlite crystals having long-axis-direction-refractive-index larger than short-axis-direction-refractive-index to a direction approximately vertical to the polymer principal chains (bonding chains).

Embodiment 3

Kneading was applied to needle-like crystals of aragonite type calcium carbonate $CaCO_3$ ranging 1 μm to 5 μm and transparent methyl methacrylate resin (By MITSUBISHI RAYON Co., Ltd. ACRYPET (Registered Trade Mark) by means of a double-axle extruder to obtain pellets. Density of the added calcium carbonate needle-like crystals was 0.02 parts by weight to 100 parts of methyl methacrylate.

Injection molding was applied to the pellets by means of an injection molding machine (NISSEI JUSHI KOGYO Ltd.; Type HM-7) to prepare a flat plate-like (35 mm×35 mm×2 mm) molding as shown in FIG. 6. In other words, the above molten resin containing the above inorganic fine particles dispersed therein was injected (poured) into a mold 4 having a shape like that shown in FIG. 6 through a gate, then a plate-like sample being taken out by mold-opening after being cooled and caked. Injection molding condition was such that nozzle temperature was 250° C., cylinder temperature 250° C., and mold temperature 80° C.

Plane-distribution of degree and direction of retardation (birefringence value Δn×light path length) of the prepared flat plate-shaped sample was measured by means of a birefringence measuring apparatus (By UNIOPT Ltd.; automatic birefringence measuring apparatus, ABR-10A-EX).

Results are shown in FIGS. 12(b) and 13(b). The same measurement was applied to a reference sample and results were shown in FIGS. 12(a) and 13(a). The reference sample was a resin plate having the same size and same shape as shown in FIG. 6 which was prepared by applying injection molding to polymethyl methacrylate containing no inorganic fine particles under the same condition.

Measurement was performed by utilizing a laser light transmitting through the flat plate-shape sample or reference sample in a plate thickness direction. According to this, retardation. maps shown in FIGS. 12(a) and 13(b) illustrate retardation values of the light transmitting a plane surrounded by sides of 35 mm approximately perpendicularly for every 1 by 1 mm square segment.

Edge portion ranging about 5 mm from the periphery was excluded from a meshed measurement area as shown in FIG. 9 in order to prevent effects of refraction and diffraction of the light from bringing errors in the same manner as in the case of Embodiment 1.

A direction to which the smallest refractive index is provided for polarized light incident perpendicularly to each segment is defined as "advancing phase axis" and another direction vertical thereto which the largest refractive index is provided is defined as "delaying phase axis", and the phase difference between the polarized lights in the respective directions was calculated as retardation for each segment.

FIGS. 13(a) and (b) are advancing phase axis maps, in which a linear line in each segment shows an advancing phase axis direction and a direction perpendicular thereto is a delaying phase axis direction. Degree of retardation is expressed stepwise by shading in each retardation map.

A portion the nearest to the gate position of the employed mold generally corresponds to the middle of the right side end in each of retardation maps shown in FIGS. 7(a) and 7(b). In this case, molten polymer also flows into the mold from the right side, heading for the left side. It is noted that the gate has a cross section which is, needless to say, much smaller than that of the mold at positions along the resin flow (approximately equal to cross section of the plate-like sample).

Referring to FIG. 13(a), advancing phase axes (directions giving a small refractive index) are directed radially from the position corresponding to the gate in the vicinity thereof. Delaying phase axes (directions giving a large refractive index) are directed perpendicularly to advancing phase axes, being directed along circumferences of concentric circles provisionally depicted from the position corresponding to the gate. Since polymethyl methacrylate has a negative orientation birefringence (that is, refractive index for an orientation direction of polymer principal chains is smaller than for a direction perpendicular thereto), principal chains of polymethyl methacrylate are orientated radially from the position corresponding to the gate.

In a similar manner, an orientation direction of polymethyl methacrylate at each part of the samples. It is to be noted that average is shown for the whole thickness and some portions have thin layer region near to the surface within which orientation directions are different from those portions inside thereof. However, it can be said statistically that almost all parts excepting the surface layer are orientated to the above-described directions.

Now comparing FIG. 12(a) with FIG. 12(b), it is understood that polymethyl methacrylate to which needle-like calcium carbonate crystals added gives the whole sample a smaller retardation.

This means that successful cancelling of negative orientation birefringence of polymethyl methacrylate is achieved by orientating needle-like calcium carbonate having long-axis-direction-refractive-index smaller than short-axis-direction-refractive-index to a direction approximately vertical to the polymer principal chains (bonding chains).

Orientation state of needle-like crystals inside of an injection molding product was observed by means of an optical microscope, and it was confirmed that orientation was directed, in the vicinity of the position corresponding to the gate, as to disposed along circumferences of foresaid concentric circles and, at the most distant position from the gate position, is directed along advancing phase axes shown in FIG. 12(b).

Embodiment 4

Kneading was applied to needle-like crystals of strontium carbonate $SrCO_3$ ranging 0.6 μm to 1 μm and transparent methyl methacrylate resin (By MITSUBISHI RAYON Co., Ltd. ACRYPET (Registered Trade Mark) by means of a double-axle extruder to obtain pellets. Density of the added strontium carbonate needle-like crystals was 0.02 parts by weight to 100 parts of methyl methacrylate.

Injection molding was applied to the pellets by means of an injection molding machine (NISSEI JUSHI KOGYO Ltd.; Type HM-7) to prepare a flat plate-like (35 mm×35 mm×2 mm) molding as shown in FIG. 6. In other words, the above molten resin containing the above inorganic fine particles dispersed therein was injected (poured) into a mold 4 having a shape like that shown in FIG. 6 through a gate, then a plate-like sample being taken out by mold-opening after being cooled and caked.

Injection molding condition was such that nozzle temperature was 250° C., cylinder temperature 250° C., and mold temperature 80° C.

Plane-distribution of degree and direction of retardation (birefringence value Δn×light path length) of the prepared flat plate-shaped sample was measured by means of a birefringence measuring apparatus (By UNIOPT Ltd.; automatic birefringence measuring apparatus, ABR-10A-EX).

Results are shown in FIGS. 14(b) and 15(b). The same measurement was applied to a reference sample and results were shown in FIGS. 14(a) and 15(a). The reference sample was a resin plate having the same size and same shape as shown in FIG. 6 which was prepared by applying injection molding to polymethyl methacrylate containing no inorganic fine particles under the same condition.

Measurement was performed by utilizing a laser light transmitting through the flat plate-shape sample or reference sample in a plate thickness direction. According to this, retardation maps shown in FIGS. 14(a) and 14(b) illustrate retardation values of the light transmitting a plane surrounded by sides of 35 mm approximately perpendicularly for every 1 by 1 mm square segment.

Edge portion ranging about 5 mm from the periphery was excluded from a meshed measurement area as shown in FIG. 9 in order to prevent effects of refraction and diffraction of the light from bringing errors, in the same manner as in Embodiment 1 and others.

A direction to which the smallest refractive index is provided for polarized light incident perpendicularly to each segment is defined as "advancing phase axis" and another direction vertical thereto which the largest refractive index is provided is defined as "delaying phase axis", and the phase difference between the polarized lights in the respective directions was calculated as retardation for each segment.

FIGS. 15(a) and (b) are advancing phase axis maps, in which a linear line in each segment shows an advancing phase axis direction and a direction perpendicular thereto is a delaying phase axis direction. Degree of retardation is expressed stepwise by shading in each retardation map.

In this case, molten polymer also flows into the mold from the right side, heading for the left side. It is noted that the gate has a cross section which is, needless to say, much smaller than that of the mold at positions along the resin flow (approximately equal to cross section of the plate-like sample).

Referring to FIGS. 14(a), (b) showing retarding maps and FIGS. 15(a), (b) showing an advancing phase axis maps, tendency similar to that in the case of Embodiment 3 can be confirmed.

Namely, it is understood that polymethyl methacrylate to which strontium needle-like crystals added gives the whole sample a smaller retardation.

Orientation state of needle-like crystals inside of an injection molding product was observed by means of a scanning electron microscope, and it was confirmed that orientation was directed, in the vicinity of the position corresponding to the gate, as to disposed along circumferences of foresaid concentric circles and, at the most distant position from the gate position, is directed along advancing phase axes shown in FIG. 15(b).

This means that successful cancelling of negative orientation birefringence of polymethyl methacrylate ARTON polymer is achieved by orientating needle-like strontium crystals having long-axis-direction-refractive-index smaller than short-axis-direction-refractive-index to a direction approximately vertical to the polymer principal chains (bonding chains).

Four Embodiments are described as above and various combinations may be employed other than resin-inorganic-fine-particle-combination so far as polymer of positive orientation birefringence and needle-like positive crystals, or, polymer of negative orientation birefringence and needle-like negative crystals are jointed.

Examples of typical optical polymers commercially available are as follows. Moreover, examples of needle-like crystals positive or negative sign of which is known already.

(1) Polymer having positive orientation birefringence; polycarbonate, ZEONOA (Registered Trade Mark; by NIPPON ZEON Co., Ltd.), ZEONEX (Registered Trade Mark; by NIPPON ZEON Co., Ltd.), ARTON (Registered Trade Mark; by JSR Ltd.)

(2) Polymer having negative orientation birefringence; polymethyl methacrylate, polystyrene (3) Positive needle-like crystals (needle-like crystals having long-axis-direction refractive index greater than short-axis-direction refractive index); basic magnesium sulfate needle-like crystals, xonotlite needle-like crystals, aluminum borate etc.

(4) Negative needle-like crystals (needle-like crystals having long-axis-direction refractive index smaller than short-axis-direction refractive index); calcium carbonate needle-like crystals, strontium carbonate needle-like crystals etc.

It is noted that needle-like crystals such as potassium titanate or magnesium carbonate, although positive/negative is not distinguished for the time being, are expected as applicable ones.

Non-birefringent resin materials obtained by the present invention may be applied to optical elements for optional uses due to non-birefringent characteristics, marked high workability of resin material, mass-productivity and other factors. One of them is application to LCD element.

Figure 16:
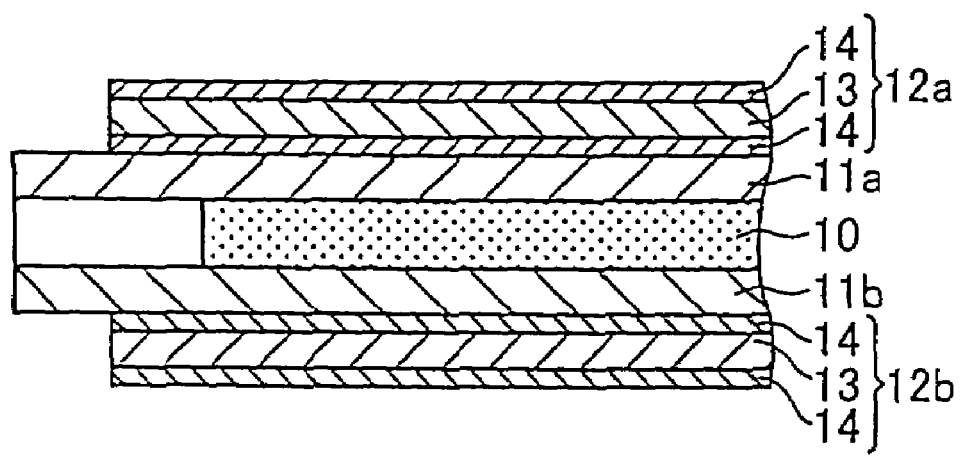
FIG. 16 is a cross section view of an example of LCD element including a liquid crystal layer, polarization plate and a resin sheet, interposed between them, to which a non-birefringent resin material obtained by the present invention is applied; and, FIG. 17 is a cross section view of another example of LCD element including a liquid crystal layer, polarization plate and a resin sheet, interposed between them, to which a non-birefringent resin material obtained by the present invention is applied.

FIG. 16 is a cross section view of an example of LCD element including a liquid crystal layer, polarization plate and a resin sheet, interposed between them, to which a non-birefringent resin material obtained by the present invention is applied. In the illustration, a liquid crystal layer is designated by numeral 10, being sealed between substrate 11a and 11b.

A pair of polarizing plate units 12a and 12b are disposed on both sides of substrates 11a and 11b. Each of polarizing plate units 12a and 12b is structured so that a polarizing plate 13 is sandwiched by resin sheets 14.

Resin sheets 14 may be made of a material such as one obtained in Embodiment 1, 2 or 3. Resin sheets 14 not only protect polarizing plate 13 but also enables light transmission to avoid beam separation from being caused by birefringence.

Figure 17:
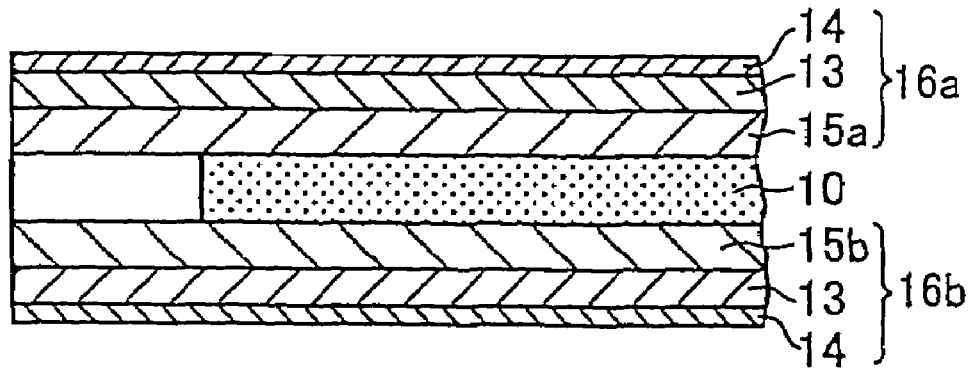

FIG. 17 is a cross section view of another example of LCD element including a liquid crystal layer, polarization plate and a resin sheet, interposed between them, to which a non-birefringent resin material obtained by the present invention is applied. In the illustration, a liquid crystal layer is designated by numeral 10, being sealed between substrates 15a and 15b.

A pair of polarizing plate units 16a and 16b are disposed on both sides of substrates 15a and 15b. Each of polarizing plate units 16a and 16b is structured so that a polarizing plate 13 is covered by resin sheet 14 from the outside.

Resin sheet 14 may be made of a material such as one obtained in Embodiment 1, 2 or 3. Resin sheets 14 not only protect polarizing plate 13 but also enables light transmission to avoid beam separation from being caused by birefringence.

(Advantage of Invention)

The present invention can provides a non-birefringent optical resin material composed of a resin material and a inorganic fine particle material which have the same sign of birefringence and a simple method of producing it.

Moreover, the provided material may be applied to optical elements for optional uses due to non-birefringent characteristics, marked high workability of resin material, mass-productivity and other factors.

What is claimed is:

1. A non-birefringent optical resin material containing a transparent polymer resin caked after flowing and a great number of inorganic fine particles dispersed in said polymer resin;
    wherein said inorganic fine particles have an orientation-birefringence by which that of the polymer resin is reinforced if major axis directions of the inorganic fine particles are parallel with an orientation direction of bonding chains of said polymer resin and is cancelled if major axis directions of the inorganic fine particles are perpendicular to the orientation direction of bonding chains of said polymer resin, and
    said bonding chains of said polymer resin orientated to an orientation direction corresponding to an external force acted in said flowing, and said great number of inorganic fine particles are orientated approximately perpendicular to said orientation direction of said bonding chains, thereby giving a non-birefringence to said optical resin material.

2. A non-birefringent optical resin material in accordance with claim 1, wherein said flowing is caused when a material containing said resin material is in a molten state and said great number of inorganic fine particles is injected into a flowing space having a relatively large cross section through an opening having a relatively small cross section.

3. A method of producing a non-birefringent optical resin material containing a transparent polymer resin caked after flowing and a great number of inorganic fine particles dispersed in said polymer resin, wherein said inorganic fine particles have an orientation-birefringence by which that of the polymer resin is reinforced if major axis directions of the inorganic fine particles are parallel with an orientation direction of bonding chains of said polymer resin and is cancelled if major axis directions of the inorganic fine particles are perpendicular to the orientation direction of bonding chains of said polymer resin, comprising:
    causing a great number of inorganic fine particles to coexist with and dispersed in a transparent polymer resin in a flowing state, thereby orienting said bonding chains of said polymer resin to a direction in correspondence to that of said flowing and orienting said great number of inorganic fine particles to be approximately perpendicular to a direction of said flowing; and,
    fixing a relation between orientation of bonding chains of said polymer resin and that of said inorganic fine particles through a caking process.

4. A method of producing a non-birefringent optical resin material in accordance with claim 3, wherein said flowing state is caused in a flowing space when a material containing said resin material is in a molten state and said great number of inorganic fine particles is injected into said flowing space having a relatively large cross section through an opening having a relatively small cross section.

* * * * *

UNITED STATES PATENT AND TRADEMARK OFFICE
CERTIFICATE OF CORRECTION

PATENT NO. : 7,485,676 B2 Page 1 of 1
APPLICATION NO. : 10/506978
DATED : February 3, 2009
INVENTOR(S) : Yasuhiro Koike It is certified that error appears in the above-identified patent and that said Letters Patent is hereby corrected as shown below:

Title Pg, Item (57) (Abstract), Line 5, change "resin." to --resin--.

Column 1, Line 21, change "resin." to --resin--.

Column 1, Line 24, change "optelectronics," to --optoelectronics,--.

Column 3, Line 20, change "polyphenilene" to --polyphenylene--.

Column 3, Line 29, change "Febuary" to --February--.

Column 3, Line 34, change "methyl methacrylate (BzMA)." to --benzyl methyl methacrylate (BzMA).--.

Column 4, Line 12, change "(A)" to --(MMA)--.

Column 4, Line 29, change "orientation," to --orientation--.

Column 10, Line 41, change "MOSH·IGE" to --MOS·HIGE--.

Column 12, Line 6, change "large" to --larger--.

Column 13, Lines 66-67, change "retardation." to --retardation--.

Column 17, Line 11, change "sheet" to --sheets--.

Signed and Sealed this

Seventh Day of April, 2009

JOHN DOLL
*Acting Director of the United States Patent and Trademark Office*